United States Patent

Coburn et al.

[15] 3,649,735
[45] Mar. 14, 1972

[54] TRANSMISSION SYSTEM

[72] Inventors: William K. Coburn; Richard E. Hillger, both of Cambridge, Mass.

[73] Assignee: The United States of America as represented by the Secretary of the Navy

[22] Filed: Aug. 17, 1955

[21] Appl. No.: 529,085

[52] U.S. Cl. .............................................. 35/10.4, 340/150
[51] Int. Cl. ..........................................................G01s 9/00
[58] Field of Search .................. 333/62, 24, 21, 22; 179/1 B;
332/24; 17/410, 43; 250/17.410, 43; 340/3, 150;
35/10.4

[56] References Cited

UNITED STATES PATENTS

| | | | |
|---|---|---|---|
| 1,896,534 | 2/1933 | Alexanderson | 179/1 B |
| 2,057,998 | 10/1936 | Bohm | 179/1 B |
| 2,379,614 | 7/1945 | Tunicle | 178/66 |
| 2,429,755 | 10/1947 | Hallmark | 179/1 B |
| 2,546,837 | 3/1951 | Stribling | 179/1 B |
| 2,712,061 | 6/1955 | McClellan | 325/163 |
| 2,780,011 | 2/1957 | Pierce | 35/10.4 |
| 2,817,909 | 12/1957 | Taylor | 35/10.4 |

OTHER PUBLICATIONS

Seely-Electron Tube Circuits, p. 181 1950.

*Primary Examiner*—Rodney D. Bennett, Jr.
*Assistant Examiner*—S. C. Buczinski
*Attorney*—R. S. Sciascia and J. W. Pease

[57] ABSTRACT

1. A sonobuoy trainer comprising means producing a position analog of a simulated submarine, means producing a position analog of a simulated sonobuoy, combining means for producing a relative position analog voltage of simulated submarine from simulated sonobuoy, a variable gain amplifier biased by said relative position analog voltage, means producing said simulated submarine speed and course, modulating means conductively coupled to and operable with said last mentioned means and said variable gain amplifier to modulate the input to said variable gain amplifier in accordance with the movements of said simulated submarine and an FM modulator and transmitter coupled to and operable with the output of said variable gain amplifier.

2 Claims, 4 Drawing Figures

INVENTOR.
WILLIAM KNOWLTON COBURN
RICHARD E. HILLGER
By
Louis B. Appleton
ATTORNEYS

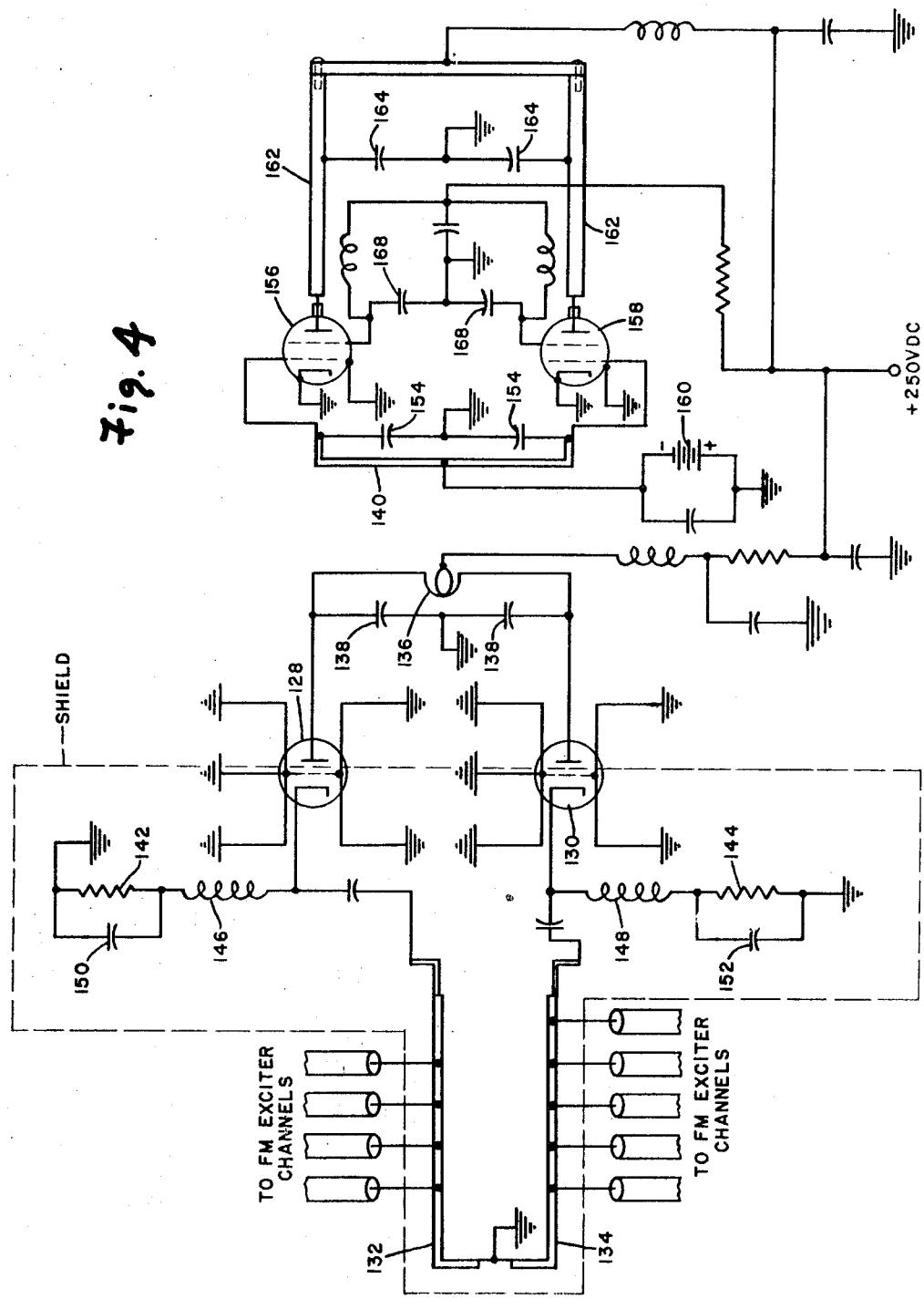

TRANSMISSION SYSTEM

This invention relates to improvements in transmission systems, and more particularly pertains to means for simultaneous radiation of a plurality of frequencies through a single antenna.

A preferred embodiment of this device comprises a sonobuoy trainer designed to facilitate the training of pilots and plane crews in the techniques of detection, identification and evaluation of underwater sound, and utilizes a system for the simultaneous transmission of a plurality of frequency-modulated signals for the generation of realistic information.

The old methods of transmitting a number of different signals on channels incorporated the aggregation of a number of transmitters, wherein a distinct transmitter was coupled to feed a distinct antenna for each channel. This invention employs a single transmitter that is coupled to feed a single antenna for the transmission of the modulated signals of a plurality of channels.

The device simulates the underwater sounds picked up normally by listening sonobuoys and transmits these sounds by frequency-modulated radio waves to the surrounding area. A trainee in an aircraft, previously informed of the location of the sonobuoys, evaluates the intensity of the signals received from the sonobuoys to determine the course and speed of the source detected by such sonobuoys. An instructor operating the unit sets the course and speed of the simulated source (such as a ship) and locates the simulated sonobuoys within a designated area.

A listening sonobuoy generates FM radio signals modulated by underwater sound. The sounds generated by a ship's propeller are of specific interest, as they can be used to determine the approximate speed and location of the vessel. In addition, sea state sounds provide a constant average noise level that tends to obscure the propeller sounds to some degree. The reciprocal of the intensity of the propeller sound is a function of the distance between the noise source and the sonobuoy.

In this device, nine FM exciters are operated on different transmitting frequency channels and are activated by audio signals that vary in amplitude according to the distance of each simulated sonobuoy from the ship. Said audio signals are varied continuously in intensity as the simulated ship, such as a submarine, moves on a course relative to the simulated sonobuoy. The audio signals supplied by the device are a combination of sea state and propeller beat sound. The combined signal is amplified and radiated as a frequency modulated radio signal from a single antenna simultaneously with the signals from each of the other simulated sonobuoys. The transmitted signals are received on a sonobuoy receiver located within the trainee aircraft. The trainee listens to the sounds received from each transmitting channel and plots the position and course of the simulated target.

The primary object of this invention is to provide means to transmit a plurality of channels of modulated signals from a single antenna;

Another object is to provide a device that reproduces accurately a plurality of discrete signals; and A further object is to provide means to transmit simultaneously a plurality of frequency-modulated channels utilizing a single amplifier coupled to feed a single antenna.

Other objects and many of the attendant advantages of this invention will be readily appreciated as the same becomes better understood by reference to the following detailed description when considered in connection with the accompanying drawings wherein:

FIG. 4 is a schematic of the transmitter final amplifier.

This device simulates the actual functioning of listening sonobuoys. Controls on a submarine course generator are used to initially position a vessel (submarine) to the east and north of a fixed reference point. A course is established and preset from this point and a speed selected. Controls on the computer are used to simulate nine sonobuoys and locate each with respect to the same fixed reference point used in positioning the submarine. Then, the vector distance of each of these sonobuoys is computed. The algebraic sum of N and $N_1$ (the submarine and sonobuoy north coordinates respectively) is added in quadrature to the algebraic sum of E and $E_1$ (the submarine and sonobuoy east coordinates respectively) to provide the distance $r$, the vector between submarine and sonobuoy. A signal proportional to this distance then varies the gain of a circuit whose input is a constant amplitude propeller beat signal. The output of this circuit is summed with a constant level sea state noise signal to furnish the audio intelligence for the corresponding FM exciter channel. The propeller beat noise and sea state noise are simulated electronically by pulse circuits and a tape recorder.

The FM transmitter, operating on the same frequencies designated for the listening sonobuoy transmits the audio intelligence from nine FM exciter channels to aircraft receivers on the trainee's aircraft.

Figure 1:
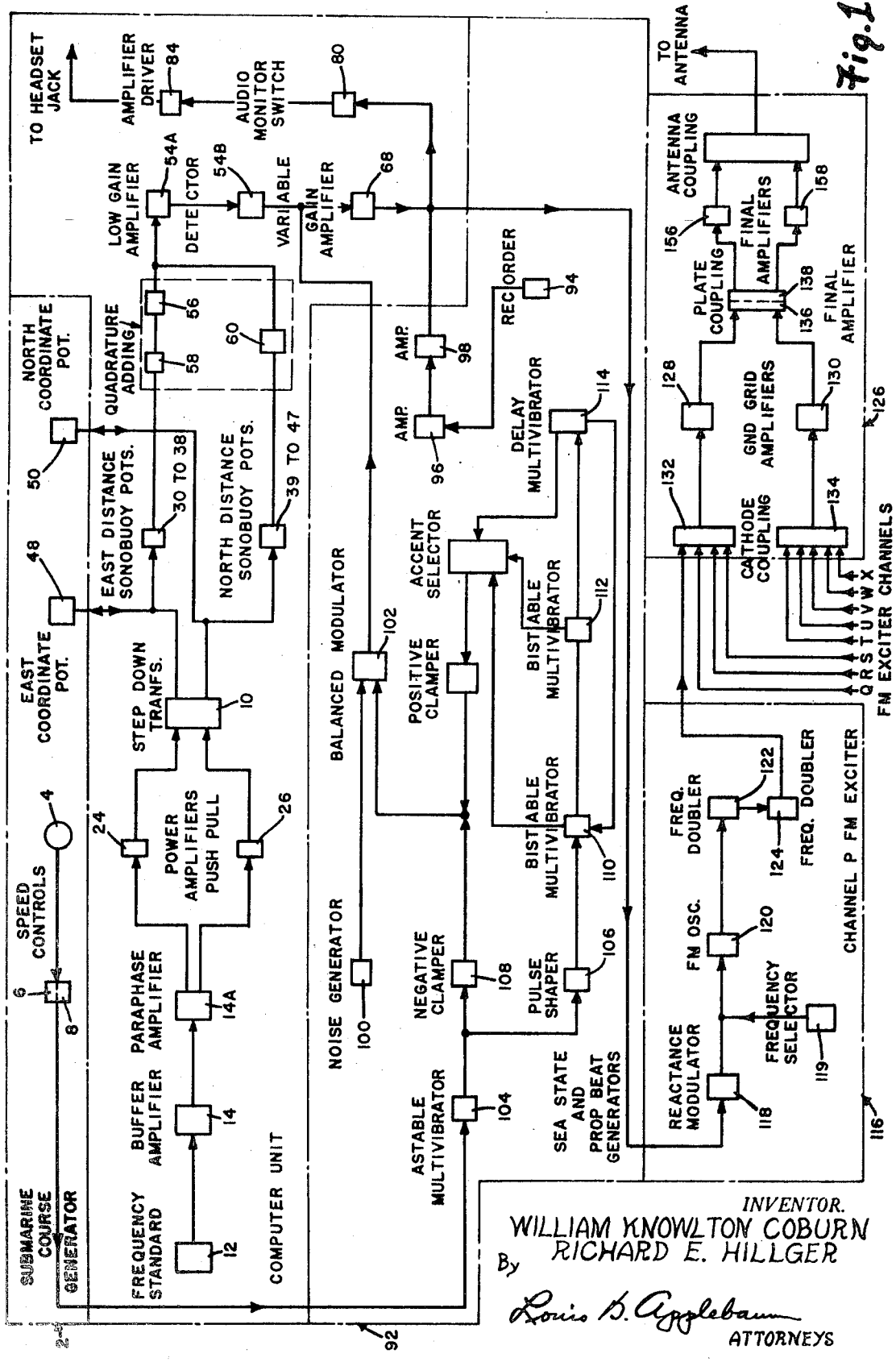
FIG. 1 is a functional block diagram of a sonobuoy trainer, showing a preferred embodiment of the invention.

In FIG. 1, the submarine course generator 2 is a device wherein the speed and course of a target may be varied independently and simultaneously. The submarine course generator contains two basic elements; one element varies the speed from 1 to 30 knots, and the other resolves speed into E and N components which results in a given target course. The drive base consists of a group of scale speed changer gears and a 60-cycle, 110-volt AC synchronous motor 4 operating at 1,800 r.p.m. The scale speed changing gears are adjusted, in this equipment, to a 20:1 ratio supplying a speed of 90 r.p.m. to the input assembly. The balance of the submarine course generator consists of a target course generator containing the speed elements and the course resolver.

The speed element is divided into two segments; the first segment provides a speed output that varies from 5 to 30 knots; the second segment changes the above output speed ratio from 5 to 30 knots to a ratio of from 1 to 30 knots.

The first speed element comprises a conventional disc-ball-roller type integrator. The disc rotates at a constant speed and the balls are displaceable along the radial axis of the disc thereby varying the output speed of the roller. Highest speed is obtained where the balls are near the outer edge of the disc. The range of the speed control is about 6 to 1 supplying an r.p.m. ratio of approximately 36 to 6 to the speed differencing differential.

The second speed element is a constant speed output of 5 r.p.m. from a conventional 10 r.p.m. Speed Differencing Motor. The output from this element changes the r.p.m. output from the variable speed element to a ratio of approximately 30 to 1 in the speed differencing differential.

The output of this differential is a variable speed element which represents the input to the course element. The input is resolved into two components; S sin∠Co and S cos∠Co, where S equals the speed of the submarine and Co is the submarine's own course. These components result in the corresponding speeds of rotation of two shafts that drive the distance east and distance north helipots and their corresponding indicating dials.

The course element is similar to the variable speed element in mechanical construction but it has two sets of ball carriages and two rollers. Both sets of balls drive rollers and each set is adjustable along the radial surface of the disc. Zero speed output of each roller is obtained at the sine-cosine quadrature points. This is accomplished by using a differential to subtract a constant speed from the variable output speed of each roller. The constant speed corresponds to the speed of the roller when the ball carriages are located at the center of the radial distance along the face of the disc.

A scotch yoke mechanism is used to move the ball carriages along the face of the disc and moves them in a manner that retains, at all times, the sine-cosine relationship between the E-W and N-S output rollers.

The target course generator provides the sonobuoy trainer with the following:

a. Maximum range of 10,000 yards.

b. Output shaft rotation supplying 1,000 yards per revolution (10 turns equal a range of 10,000 yards); direction of rotation reversible depending upon position of the related ball carriages and the course driving disc.

c. Distance indicator dials (connected to output shafts) reading from 0 to 10,000 yards in clockwise direction.

d. Speed variations from 1 to 30 knots.

e. Course selector varying the bearing from 0° at North, to 90° at East, to 180° at South and 270° at West.

f. The limit of obtainable ratios between the course driving disc and the driven shafts are 1 to 2 and 1 to 10.

The speed control governing the propeller beats per minute is a dual potentiometer 6 and 8, driven by a spur gear that is moved by a rack attached to the speed carriage. The potentiometers are 1 megohm controls connected in series with 10K resistors in the grid circuits of a astable multivibrator.

The Computer supplies continuous horizontal range information between the simulated submarine and each of the simulated sonobuoys. This range information, which is changed from an AC to a DC voltage, is used to vary the gain of an amplifier whose input is a constant prop beat signal. The prop beat signal, varying in amplitude inversely with changes in range, is summed with sea state signals and then used to modulate an FM carrier of the transmitter. The input to each computer channel subassembly must be a precision 400-cycle signal to achieve the required accuracy in the calulation of range. For that reason, the computer employs a 400-cycle power supply 12 which delivers its 400-cycle voltage to an output transformer 10 with a frequency tolerance of at least 1 part in 10,000 over the operating range of the equipment. The 400-cycle voltage is developed by 12, an American Time Products, Type 2001-2 frequency standard. Essentially this unit consists of a tuning fork and an amplifier. The tuning form oscillator is operated on a drive and pickup electromagnetic system. The magnetic assembly is located between the tines in the fork and the whole assembly is housed in a hermetically sealed unit. The output from the tuning fork is applied to a high-gain pentode which also has a negative feedback stabilizing loop, through a voltage sensitive element, that insures frequency and amplitude stability of the tuning fork input. A second tube, also a pentode, is connected as a triode to insure stability of amplification.

Figure 2:
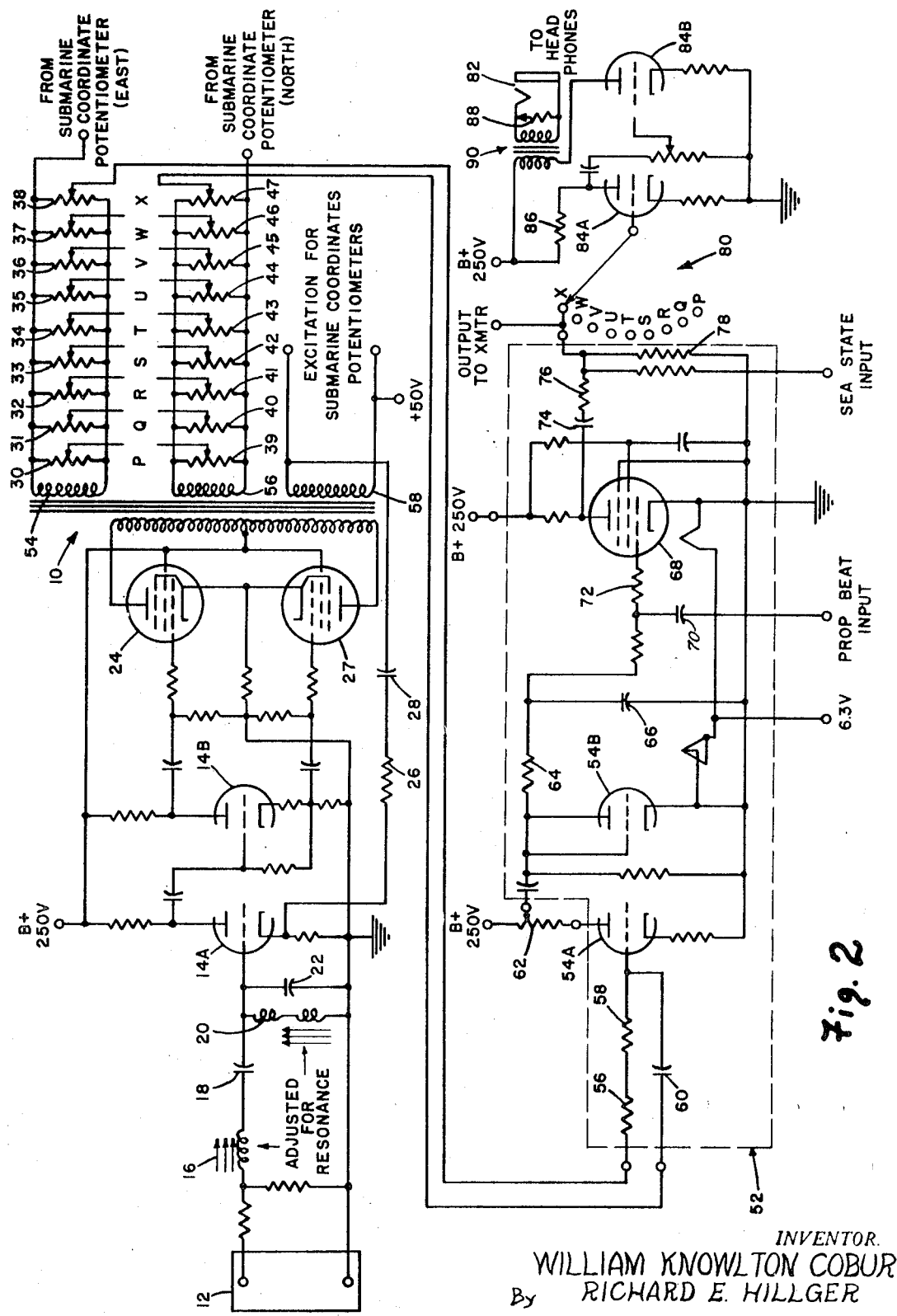
FIG. 2 is a schematic of the computer component thereof.

As shown in more detail in FIG. 2, the output from this frequency standard is applied to one grid of 14A (a dual triode) through a coil 16, a condenser 18, a coil 20, and a condenser 22, a series and a parallel resonant circuit. The series-parallel tuned circuit minimizes the possibility of distortion at the input of vacuum tube 14A by permitting only one frequency to be present at the grid. The series resonant circuit passes only the 400-cycle component from the limited distortion in the output of the frequency standard. The parallel tuned circuit is a low-pass filter for all frequencies but 400 cycles. The 400-cycle signal is amplified in the first triode section and is then RC coupled to a paraphase amplifier 14B which provides the drive for vacuum tubes 24 and 27, a pair of 6AQ5, power pentodes in push-pull. The cathode of 14a has a feedback circuit consisting of the resistor 26, and condenser 28, which increases the linearity of this amplifier.

Figure 3:
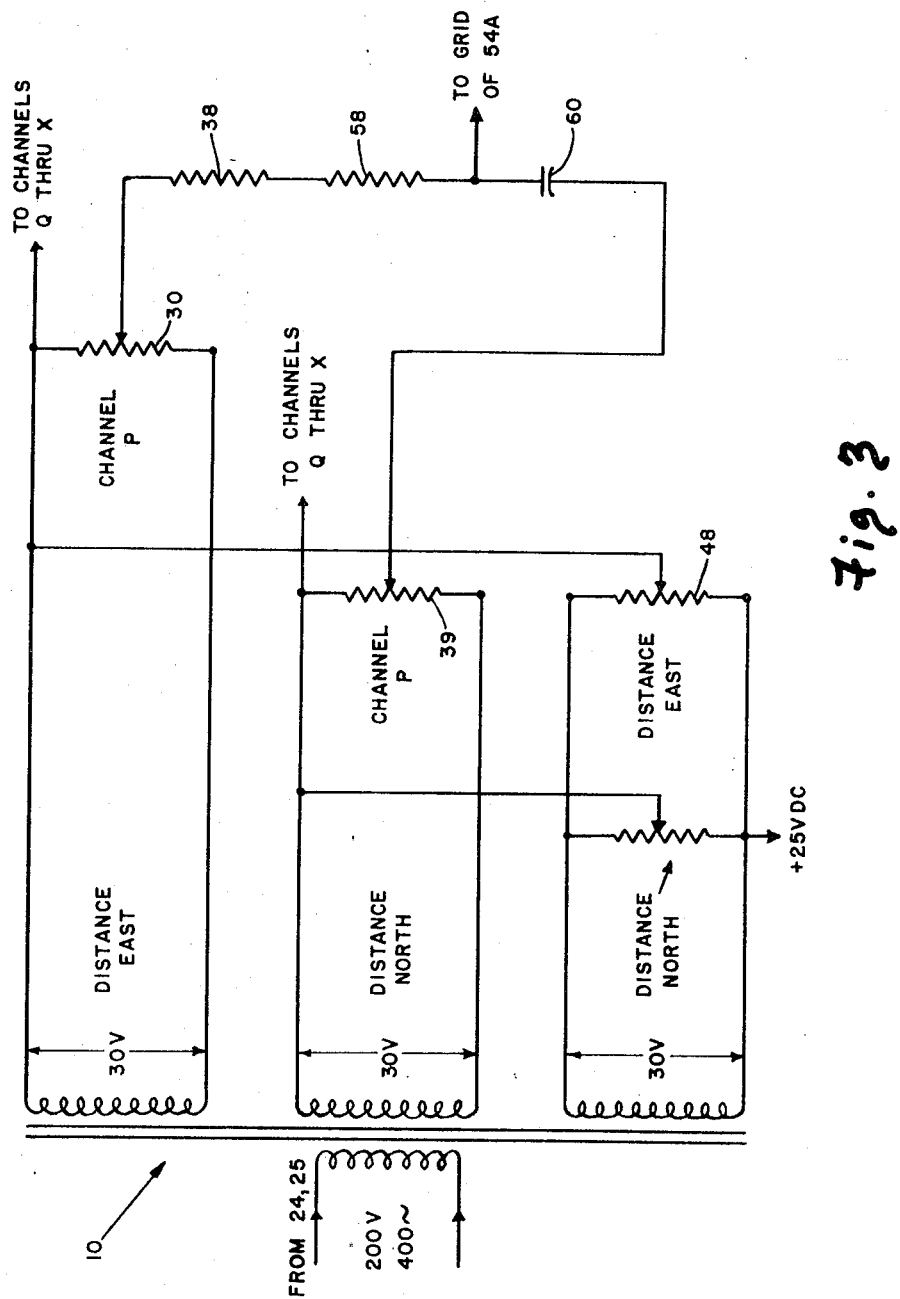
FIG. 3 is a schematic of the network for the algebraic summing of sonobuoy to submarine coordinates.

The sonobuoys are positioned east and north by distance east controls, resistance 30 through resistance 38, and the distance north controls, resistance 39 through resistance 47. The submarine is positioned by adjusting the distance east control, resistance 48, and the distance north, control resistance 50, to the desired coordinate values. These controls are helipots connected across the secondary windings of the transformer 10 in an algebraic network as shown in FIG. 3. The potentials taken from the center arm of potentiometers 48 and 50 are algebraically added to the distance east and distance north helipots, 30 through 38, by adding or subtracting this AC potential to that developed in the secondary windings across the channel sonobuoy helipots. The coor-dinate potentiometers excitation voltage is taken from the step down transformer 10. This push-pull output transformer has a primary impedance of 10,000 ohms and three independent secondary windings with impedances of 1,100, 1,100 and 500 ohms. Each secondary is in phase with the other within ± one-tenth of 1°. The voltage across each secondary is identical within one-tenth of 1 percent. In addition, the primary to secondary phase shift is within one-half of 1° and the total power output at full load is 10 watts at 400 cycles.

The transformer and excitation voltage power supply present a very stable and accurate frequency component to the RC phase shifting circuits at the inputs to the units 52.

The coordinate potentiometers for the submarine and sonobuoys are arranged in an algebraic network across transformer 10 as shown in FIG. 3. The primary of the transformer is excited by 200 volts at 400 cycles from the push-pull amplifiers 24 and 26, and the secondary has three separate 30-volt windings 54, 56 and 58. A 25-volt DC bias potential is used for the low-gain amplifier 54A.

The output from the summing network is a 400-cycle signal varying from 0 to 30 volts AC for each distance (north and east). The signals from each set of coordinates are then applied to the channel signal amplifying units Z201 (P through X). The plug-in assemblies 52 one for each channel P through X are identical in design and construction. Each plug-in assembly 52 provides the following for each sonobuoy channel:

A. The algebraic sum of the submarine and sonobuoy coordinate 400-cycle voltages both east and north are fed to the input circuit. It combines these two voltages by quadrature addition using the phase shifting network consisting of potentiometers 56 and 58 and condenser 60 in the grid circuit of tube 54A. Each directional voltage (north and east) is phase-shifted 45° in the opposite direction to provide a virtual shift in the phase of combined signal of 90°.

B. The new voltage representing the range and azimuth between the sonobuoy and submarine is amplified by vacuum tube 54A biased as a class A amplifier. (See FIG. 2 again.) The output from 54A is variable depending on the setting of potentiometer 62, gain control, a potentiometer used as the plate load for this low-gain amplifier.

C. The 400-cycles output from tube 54A is coupled to a detector stage 54B (the second section of 54 connected as a diode). This stage in conjunction with the filter, comprising the resistance 64 and condenser 66 provides a bias potential at the control grid of vacuum tube 68, the variable gain amplifier. The prop beat signal is applied to the assembly 52. The signal is coupled to the grid by condenser 70 through a grid limiting resistor 72. Vacuum tube 68, a type 5749 pentode tube is connected as an audio amplifier. The output is applied to an RC coupling circuit 74, 76 and 78. The sea state generator signal is summed with the amplified prop beat signal at this point in the circuit and this sum appearing across resistance 78, is applied to the transmitter input. The signal is then applied to the corresponding channel FM exciter unit, where it is used to modulate the frequency of the oscillator.

The audio monitor switch 80 permits the sampling of each sonobuoy channel using a pair of headphones at contacts 82. The center arm of the switch is connected to the grid of the amplifier driver 84A, a dual triode audio amplifier. The coupling between the amplifiers is RC but the resistance 86 is variable which provides a means of varying the gain of the monitor circuit. A 500-ohm resistor 88, is shunted across the transformer 90 when the headphones are not plugged into contacts 82.

The modulating components of the transmitted radio wave are developed in the sea state and prop beat generator 92. The sea state noise and prop beat noise are simulated by a tape recorder and pulse circuits. The simulated sea state noise is developed by playing recordings taken of sea noise on a commercial type, tape playback device. The Pentron 9MC 9T–3M tape recorder 94 is used as the sea state generator.

a. The 9T–3M tape recorder is modified so that only the playback mechanism is used in this equipment.

b. The changes allow the recorder to be operated from front panel controls on the console, the use of a single continuous reel of tape, and the operation at the fixed slow speed of 3 ¾ inches per second.

c. The recorder motor operates on 115-volts, 60-cycles AC power applied from the AC power supply circuit in the computer. The motor speed is 1,550 r.p.m. It drives the flywheel-capstan through a reduction drum to produce a tape speed, through the playing head, of 3 ¾ inches per second. One-hundred-foot reels provide approximately 5 ½ minutes of continuous sea noise before repeating.

d. The tapes, sea state No. 2 and sea state No. 4, are recordings made of actual sea state noise taken at specified depths in the ocean. The output from the pickup head is applied to a pair of class A amplifiers, 96 and 98 of the 12AX7 type, in cascade and is then applied to the output of the vacuum tube 68 as is shown in FIG. 1.

The prop beat generator simulates propeller noise by amplitude modulating a noise signal from a gaseous-type tetrode tube 100 of the 2D21-type thyratron. The modulation is developed by positive and negative voltage pulses that are applied with the noise signal to the grid of a balanced modulator 102 that is of the 12AU7 tube type. The positive and negative modulating pulses are initiated by a free running multivibrator whose output frequency may be varied. The frequency of the negative pulses are a direct function of the multivibrator frequency but the positive pulses may be selected at one-half, one-third, or one-fourth the PRF of the negative pulses. The negative pulses decrease the amplitude of the noise signal to approximately zero. The excursion of the negative pulse on a positive direction increases the noise to its normal level, which produces the effect of a propeller beat. The accentuated propeller beat, occurring at submultiples of the negative pulse, is caused by the positive pulses which increase the amplitude of the noise signal during an interpulse period between two successive negative pulses. The initiating voltage pulses and triggers are generated by the free running (astable) multivibrator 104 and its associated circuitry. The circuit is designed as a free running, astable, multivibrator with a PRF that can be varied by the speed control, The output of the multivibrator 104 is a symmetrical rectangular pulse that can be varied by adjusting the dial setting of the speed control.

The symmetrical rectangular pulses are routed in two directions. They are applied to a pulse shaper 106, and to a negative clamping circuit 108. The rectangular voltage pulses applied to pulse shaper 106 are differentiated and divided by the combination of an RC circuit, and capacitor voltage-divider in the grid circuit of a type 6AQ5 vacuum tube. Said tube was designed as a biased pulse amplifier. The positive portion of the differentiated pulse is very sharp, providing an excellent trigger for the first countdown stage.

The countdown circuits or modulator circuits, are binary counters capable of frequency division of one-half, or one-fourth the frequency of the free running multivibrator 104. Frequency division can be accomplished by selection at a selector switch. These circuits consist of two bistable multivibrators 110 and 112, and one delay multivibrator 114. The delay multivibrator 114, a quasi-stable multivibrator, changes the state of the bistable multivibrators 110 and 112 to produce a frequency division equal to one-third the frequency of 104. The first digital countdown circuit is the bistable multivibrator 110, an adaption of the well known flip-flop multivibrator. The negative trigger pulses from the pulse shaper 102 are capacitively coupled to the plate circuit of multivibrator 110. This circuit produces one complete cycle for every two cycles of the astable stage. The positive-going scale-of-two output pulses from the plate of the multivibrator 110 are applied to the accent selector switch and the negative-going scale-of-two output pulses from the other plate of the multivibrator 110 are differentiated by a coupling capacitor and a load resistor in the circuit of multivibrator 112. The negative portion of the differentiated rectangular pulse triggers the bistable multivibrator 112 on every other negative input trigger. The resulting output from the plate of said multivibrator is a positive rectangular pulse with a PRF equal to one-fourth the PRF of the free running multivibrator 104. The output from this scale-of-two binary counter is applied to the accent selector switch. The negative-going rectangular pulse from the other scale of the multivibrator 112 is used to produce a scale-of-three countdown from the multivibrator 112.

The delay multivibrator circuit 114 is a quasi-stable, multivibrator designed to provide a delayed feedback pulse when triggered by the second scale-of-two binary counters 112. When the accent selector switch is positioned to pick up the output of the multivibrator 112, the leading edge of the negative-going rectangular pulse from the second plate of 112 triggers the delay multivibrator 114. This multivibrator develops an output pulse that is delayed approximately 80 microseconds from the initiating trigger. The delayed trigger is coupled back to the grid of the second position of the multivibrator 110 increasing the cycling operation of the countdown circuit. The resulting positive pulse output at the plate of the first section of multivibrator 112 is equal to one-third the PRF of the free running multivibrator 104. The pulse output from the plate of the negative clamper 108 is applied to a negative clamping circuit consisting of crystal diode and a resistor through a coupling capacitor. The output of the clamping circuit is then applied to the prop gain control comprising a potentiometer as a negative-going pulse. This negative going pulse is added to the output of a gain control potentiometer. The voltage appearing at the output of the selector switch will be a positive rectangular pulse with a pulse width proportional to position numbers that appear on the selector switch. The positive-going rectangular pulse is differentiated and clamped positively by said crystal diode. The positive pulses from the prop gain control are coupled through isolating resistors to the grid of the balanced modulator circuit.

Propeller noise is generated by the noise generator 100, a 2D21-type thyratron tube. The tube is continuously fired and the resulting noise caused by collision of the gaseous ions appears as random voltage in the plate circuit. The random signals are coupled by a condenser to the grid circuit of the balanced modulator 102. The quality of the noise from the prop beat generator can be adjusted by a noise control potentiometer which is in series with the filament of the noise generator 100. This selection of noise quality is possible due to the fact that molecular motion is a function of the filament temperature and noise quality is a function of molecular motion. The combined positive and negative modulating signal is applied simultaneously to the grids of the balanced modulator 102. The noise signal applied to first grid of 102 is modulated according to the amplitude of these combined modulating signals. However, due to the fact that a transformer is connected between both plates of 102 the modulating pulses are balanced out and the output signal developed by the balanced modulator 102 contains only modulated noise signals. The secondary of said transformer is connected across the prop beat gain control potentiometer that is used in adjusting the prop beat noise. The modulated noise signal representing propeller beat sound is coupled to the computer through vacuum tube 68.

The FM transmitter consists of nine channel exciters, a single final amplifier and a power supply. It is a wide-band, low-power transmitter operating on frequencies from 162.25 to 173.5 megacycles. These frequencies cover the 16 preset channels designated for the sonobuoys. The carrier is frequency modulated using the reactance modulator system. The modulating component is made of the audio frequencies developed by the sea state and prop beat generator. The individual FM exciter subassemblies are identical in design and can be interchanged if necessary. Each FM exciter unit 116 consists of a tuning assembly, a reactance modulator stage, an oscillator and doubler stage, and a final doubler stage. The output of each exciter is fixed at a constant power level. The tuning assembly of each exciter unit 116 can be adjusted to five preset adjacent frequencies out of the 16 possible channels. The nine exciters have their frequencies staggered to cover all the channels.

A mechanical tuning assembly permits immediate and accurate setting of the tuning slug, in the oscillator coil, to the preset sonobuoy channel designated on the front panel of each FM exciter unit. Each frequency channel is separated by 750 kc. and each channel has a bandwidth of 150 kc. (±75 kc. deviation). This allows a 600 kc. frequency guard band between channels.

The input to each exciter 116 is the audio signal output from the corresponding unit 52 (See FIG. 2). The audio signals from the computer are applied to a condenser and resistor in parallel in the exciter. This RC circuit constitutes a preemphasis circuit required to emphasize the high-frequency components of the audio signals. The sonobuoy receivers used with this equipment have the counterbalancing deemphasis circuits to equalize the increased highs. Reactance modulator 118 is a 6AK5-type amplifier tube. The circuit is designed so that a lagging current is developed in the plate circuit making the tube act as a shunt inductance. A variation in plate current in the reactance modulator 118 causes a variation in the shunt inductance and hence a change in the oscillator frequency. The lagging current is developed by a phase shifting network consisting of a resistance and the shunt capacity, Cg, between grid and cathode of 118. The oscillator signal voltage applied across this network produces a lagging voltage across the tube capacitance. This, in turn, produces the lagging plate current that makes the tube an effective inductance. When the modulation signal is also applied to the grid of 118, the plate current will rise and fall in a linear manner. Since this current lags the oscillator plate current, it makes the apparent inductance of the oscillator tank decrease and increase, hence causing the oscillator frequency to rise and fall. Thus, the reactance tube produces frequency modulation of the oscillator stage.

The triode 120, a 6U8-type tube functions as a shuntfed, grounded cathode, ultraudio oscillator. This oscillator is tuned mechanically by a frequency selector 119 that moves a brass tuning slug in and out of the coil. A variable shunting capacitor allows the oscillator tank circuit to be adjusted to compensate for frequency drift. In addition, temperature compensating capacitors are used to stabilize the oscillator frequency. The reactance modulator plate circuit is shunted across one-half of the oscillator coil causing the effective change in inductance to deviate the oscillator frequency around its natural frequency. This frequency changing at an audio rate, provides a frequency modulated input to the next stage, the first doubler 122.

The first doubler 122, a triode-pentode of the 6U8 type doubles the frequency supplied by the oscillator 120 resulting in a frequency of approximately 80 megacycles. This is accomplished by a tank circuit in the plate section consisting of a coil and a variable capacitance. The output from the first doubler tank circuit is coupled through a condenser to a second doubler 124 that is an RF pentode of the 6AG5 type. The output of this stage supplies the tank circuit that is tuned to twice the frequency of the input tank circuit. The frequency output at this stage is between 162.5 and 173.5 megacycles. The plate circuit of this stage contains a pi-network impedance matching circuit that consists of a condenser across the doubler tank. Said condenser is variable and is designed to tune out the mismatch between the output of this circuit and the low impedance of the cathode-input of the grounded grid mixer stage in the final amplifier. Referring now to FIG. 4, the final amplifier 126 contains a pair of grounded grid amplifiers for mixing and a push-pull output stage. The amplifier is designed to handle the signals from nine channel exciters without interaction between adjacent channels and to drive a half-wave dipole antenna.

The mixer stage consists of a pair of grounded grid amplifiers 128 and 130 that are of the 6AM4-type triode. The outputs from the nine exciter stages are fed by coaxial line to individual taps on inductive strips of copper, or coils, 132 and 134 in the cathode circuits of each triode. The grids are grounded to a copper shield and the plates are connected to a tank circuit consisting of a two-section butterfly capacitor, 138 and a single-turn loop 136. A change in the mutual inductance coupling can be made by moving the position of the loop in relationship to the grid inductor 140.

The mixer tubes are biased for Class A operation using cathode bias developed by resistors 142 and 144. The coils 134, 146, and 148 are RFC coils which act as high-pass filters and condensers 150 and 152 are cathode decoupling capacitors. These circuits are designed to provide a linear output regardless of the number of input taps activated for a given problem. Even though the cathode inputs are unbalanced (four on inductance 132 and five on inductance 134) they have been individually adjusted to make allowance for the assymetry of the two input circuits. Another unusual feature of this amplifier is the grounded split-tank circuits in the grid and plate circuits, of the two stages. This design effectively permits the combining of two, amplifying strips using common grid and plate circuits.

Circuit features which make for a linear output and an absence of intermodulation between the input signals are the use of low-impedance inductive strips or coils 132 and 134 as input elements, arrangement of the coaxial line feeders in descending frequency order from the ground connection to the cathodes of the tubes and proper spacing of the coaxial line feeders on each strip so that the impedance viewed by each feeder, when looking toward the cathode, is the same.

The output from the grounded grid mixer stage plate circuit is inductively coupled to a split-tank circuit consisting of butterfly capacitor 154 and inductance 140 in the grid circuits of the vacuum tubes 156 and 158. The tubes are operated Class A, in push-pull, using a fixed bias of a 15-volts battery 160. The output of each tube is taken from a plate cap on the top of the tube into a section of tuned parallel lines, inductance 162, or a coil that acts as the output tank. The output tank is tuned by a butterfly capacitor 164. The output stage is neutralized by shunting the screen circuits of 156 and 158 with a section of butterfly capacitor 168.

The output to the antenna is inductively coupled by an inductance that may comprise a loop of copper tubing or a coil. A variable capacitor, in series with said inductance cancels the stray capacitance in the coupling circuit. The antenna is a wide-band, half-wave dipole, oriented in a vertical plane and tuned for the lowest frequency.

I claim:

1. A sonobuoy trainer comprising means producing a position analog of a simulated submarine, means producing a position analog of a simulated sonobuoy, combining means for producing a relative position analog voltage of simulated submarine from simulated sonobuoy, a variable gain amplifier biased by said relative position analog voltage, means producing said simulated submarine speed and course, modulating means conductively coupled to and operable with said last mentioned means and said variable gain amplifier to modulate the input to said variable gain amplifier in accordance with the movements of said simulated submarine and an FM modulator and transmitter coupled to and operable with the output of said variable gain amplifier.

2. A sonobuoy trainer comprising means producing a position analog of a simulated submarine, a plurality of means producing a plurality of position analogs of a plurality of simulated sonobuoys, combining means for producing relative position analog voltages of said simulated submarine from each of said sonobuoys, a plurality of variable gain amplifiers each biased by a different relative position analog voltage, means producing said simulated submarine speed and course, modulating means conductively coupled to and operable with said last mentioned means and each of said variable gain amplifiers to modulate the input to each variable gain amplifier in accordance with the movements of said simulated submarine, amplifying means coupled to receive and operable with the outputs of all variable gain amplifiers and an FM modulator and transmitter coupled to and operable with said amplifying means.